United States Patent [19]
Turkiyyah et al.

[11] Patent Number: 6,094,199
[45] Date of Patent: Jul. 25, 2000

[54] 3D OBJECTS MORPHING EMPLOYING SKELETONS INDICATING SYMMETRIC DIFFERENCES TO DEFINE INTERMEDIATE OBJECTS USED IN MORPHING

[75] Inventors: George M. Turkiyyah; Duane W. Storti, both of Seattle; Mark A. Ganter, Edmonds, all of Wash.

[73] Assignee: University of Washington, Seattle, Wash.

[21] Appl. No.: 08/862,621

[22] Filed: May 23, 1997

Related U.S. Application Data

[60] Provisional application No. 60/018,281, May 24, 1996, provisional application No. 60/018,278, May 24, 1996, provisional application No. 60/018,292, May 24, 1996, provisional application No. 60/019,075, Jun. 3, 1996, provisional application No. 60/018,280, May 24, 1996, provisional application No. 60/018,279, May 24, 1996, and provisional application No. 60/044,936, Apr. 25, 1997.

[51] Int. Cl.[7] .................................................. G06T 15/00
[52] U.S. Cl. .......................................... 345/419; 345/473
[58] Field of Search .................................... 345/473, 428, 345/953, 955, 429, 420, 424, 441; 382/308, 259

[56] References Cited

U.S. PATENT DOCUMENTS

| | | | |
|---|---|---|---|
| 5,175,808 | 12/1992 | Sayre | 345/433 |
| 5,590,261 | 12/1996 | Sclaroff et al. | 345/473 |
| 5,613,048 | 3/1997 | Chen et al. | 345/419 |
| 5,619,628 | 4/1997 | Fujita et al. | 345/427 |
| 5,742,291 | 4/1998 | Palm | 345/420 |
| 5,818,458 | 10/1998 | Saito | 345/441 |
| 5,850,229 | 12/1998 | Edelsbrunner et al. | 345/473 |
| 5,920,319 | 7/1999 | Vinig et al. | 345/420 |
| 5,920,320 | 7/1999 | Shimizu | 345/422 |

OTHER PUBLICATIONS

Shapira, M. and Rappoport, A.; Shape Blending Using the Star–Skeleton Representation; IEEE Computer Graphics and Applications; pp. 44–50, 1995.

*Primary Examiner*—Mark K. Zimmerman
*Assistant Examiner*—Albert K. Lee
*Attorney, Agent, or Firm*—Ronald M. Anderson

[57] ABSTRACT

The present invention provides a unified, automated approach to 3D object interpolation and 3D morphing based on a geometric descriptor known as the skeleton. The skeleton of an object consists of the closure of the set of points minimally equidistant from two points on the object's boundary. An "intermediate 3D object" between a pair of two other 3D objects is obtained as the (trimmed) skeleton of the symmetric difference of the pair of objects. By applying this process recursively, any desired number of intermediate 3D objects between a first and a last object may be obtained to produce a discrete 3D morph. A discrete morph can be thought of as an animation starting from the initial object and ending with the final object after a given number of the intermediate objects. Alternatively, the skeleton is used to identify corresponding points on the surfaces of the objects. Interpolation between the location of the corresponding points is then used to determine a continuum of intermediate 3D objects.

23 Claims, 7 Drawing Sheets

3D OBJECTS MORPHING EMPLOYING SKELETONS INDICATING SYMMETRIC DIFFERENCES TO DEFINE INTERMEDIATE OBJECTS USED IN MORPHING

RELATED APPLICATIONS

This application is based on prior copending provisional applications, Ser. Nos. 60/018,281, 60/018,278, 60/018,292, 60/018,280, and 60/018,279, all of which were filed on May 24, 1996; Ser. No. 60/019,075, filed Jun. 3, 1996; and provisional application Ser. No. 60/044,936 filed Apr. 25, 1997, the benefit of the filing dates of which is hereby claimed under 35 U.S.C. §119(e).

FIELD OF THE INVENTION

The present invention generally relates to computer-aided geometric design, shape generation, and animation, and more specifically, relates to creating intermediate shapes used in geometric metamorphosis (or "morphing") between multi-dimensional shapes using a computer.

BACKGROUND OF THE INVENTION

The media has greatly popularized the concept of morphing by showing portrait video images of a series of individuals that appear to flow from one individual to another as if the features of each successive individual were plastically changing to become the next individual in the sequence. Several computer software programs for the personal computer such as "Morph" (from Gryphon Software Corporation) enable a user to select a series of corresponding points on two images to define a morphing transformation between the two images occurring over a predefined number of image frames. While image morphing or generating intermediate images to transform between an initial image and a final image has thus become a common feature in twodimensional (2D) graphics software packages, reliable methods for the analogous process applicable to three-dimensional (3D) shapes are not available. In the following discussion, the process of creating a single intermediate 3D shape is referred to as shape interpolation and the process of generating a sequence of intermediate shapes is referred to as shape metamorphosis, or 3D morphing ("geomorphing").

Previous approaches to 3D morphing can be divided into two general classes based on the type of solid model representation employed: parametric or implicit. Parametric models describe a solid using a collection of patches that together form the boundary of the solid and include topological information regarding patch connectivity. Since the overall patch structures of the initial and final objects need not be the same, even attempting to determine how the general patch structure should change to morph the initial object into the final object is difficult and requires significant user intervention. The second class of techniques employs implicit models to describe an object using mathematical functions whose value at a given point determines whether that point is inside, outside, or on the surface of the object. A simple "function interpolation" 3D morph is available in the implicit modeling environment whereby intermediate object shapes are generated by the functions obtained by interpolating between the implicit functions defining the initial and final objects. However, this approach to 3D morphing is clearly not applicable to other modeling environments and produces undesirable effects. For example, a simple morph of this type between two objects, each of which is connected as a single component, can produce intermediate objects that break into disjointed pieces.

From the preceding discussion, it will be apparent that a unified, automatic approach to shape interpolation and morphing in three dimensions has been missing in the art and would be of great use to designers and animators. Since the techniques used for morphing 2D shapes are not readily extensible to 3D objects, an approach more suitable for 3D objects is needed.

SUMMARY OF THE INVENTION

In accordance with the present invention, a method is defined for morphing between a plurality of 3D objects, each of which is represented by boundary data. The method includes the step of creating a list of the 3D objects and a desired number of intermediate 3D objects that will be used when morphing between the 3D objects. For a pair of 3D objects that are adjacent in the list, the method provides for determining an intermediate 3D object by finding a symmetric difference between the pair of the 3D objects and a skeleton of the symmetric difference that defines the intermediate 3D object. A reference to the intermediate 3D object is inserted between the pair of 3D objects in the list. The preceding two steps are then repeated for other pairs of the 3D objects in the list, including the intermediate 3D objects that are thus created, until the desired number of intermediate 3D objects is obtained, so that a final list is produced that includes the plurality of 3D objects and the intermediate 3D objects in an order in which they occur when morphing between the 3D objects.

A user is enabled to visually perceive the morphing when the successive 3D objects in the final list are displayed in sequence. The step of determining the intermediate 3D object preferably comprises the step of determining a volume corresponding to a closure of a set of points included in one of the pair of 3D objects that is not included within the other of the pair of 3D objects. This volume comprises the symmetric difference between the pair of 3D objects. In addition, the skeleton is determined for the volume, and any portions of the skeleton that are not part of a closed boundary for a 3D region that the skeleton encloses are trimmed away. As an alternative to specifying the number of intermediate objects, a total time to morph between the plurality of 3D objects and a time interval for each intermediate 3D object can be identified.

The step of finding the skeleton of the symmetric difference includes the step of identifying each point that is minimally equidistant from two points on a boundary of the symmetric difference.

Another aspect of the present invention is directed to a method for determining intermediate 3D objects between a pair of 3D objects, wherein each 3D object of the pair is represented by boundary data. The method includes the step of determining a volume corresponding to a closure of a set of points included in one 3D object of the pair that is not included within the other 3D object. The volume corresponds to the symmetric difference between the pair of 3D objects. A skeleton is determined for the symmetric difference, and a plurality of maximal spheres centered on the skeleton is determined. Each of the plurality of maximal spheres is tangent to one point on a boundary of each of the pair of 3D objects and is disposed within the volume, so that two such points of tangency are determined for each maximal sphere, including one point of tangency for each 3D object of the pair of 3D objects. An association is created between the two points of tangency for each of the plurality of maximal spheres, so that the two points that are thus associated define ends of line segments through different maximal spheres. Next, the method includes the step of interpolating between the two points of tangency along each of the line segments, to define a plurality of interpolated points. Corresponding interpolated points on the line segments are connected together to represent the intermediate 3D objects.

A further aspect of the present invention is directed to apparatus for determining intermediate 3D objects between a pair of 3D objects for use in morphing. Each 3D object of the pair is represented by boundary data. The apparatus includes a memory in which is stored a plurality of machine instructions that comprise a computer program. A processor is coupled to the memory and carries out a plurality of functions when executing the machine instructions comprising the computer program. The functions are generally consistent with the steps of the methods described above.

Yet a still further aspect of the present invention is directed to an article of manufacture adapted to be used with a computer, for determining intermediate 3D objects between a pair of 3D objects for use in morphing. Each 3D object of the pair is represented by boundary data. The article of manufacture includes a memory media on which a plurality of machine instructions is stored. When executed by a computer, the machine instructions cause the computer to implement functions that are also generally consistent with the above discussion.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 3A:
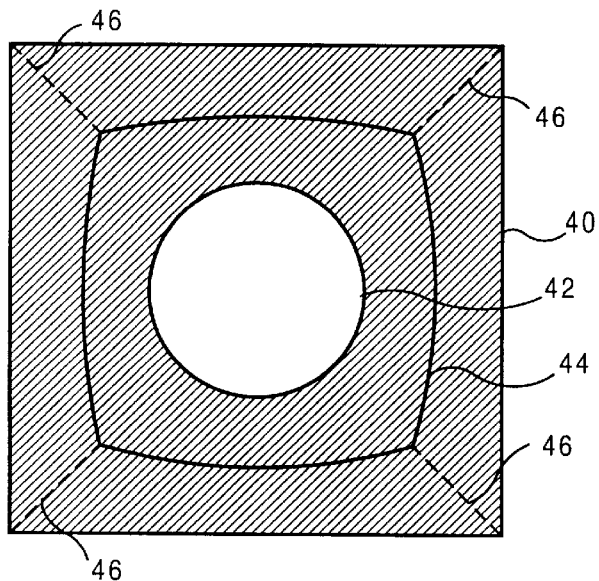
Figure 3B:
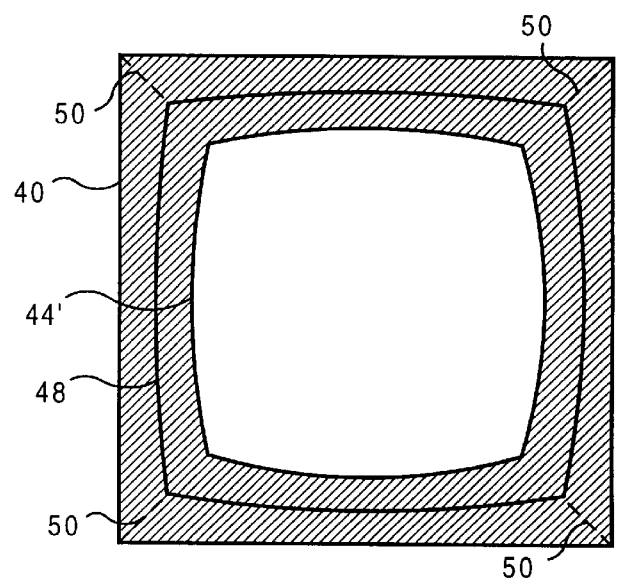
Figure 3C:
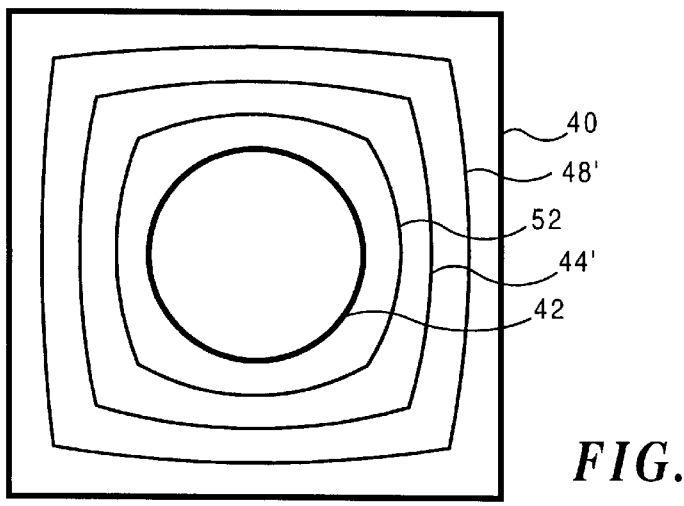
Figure 4A:
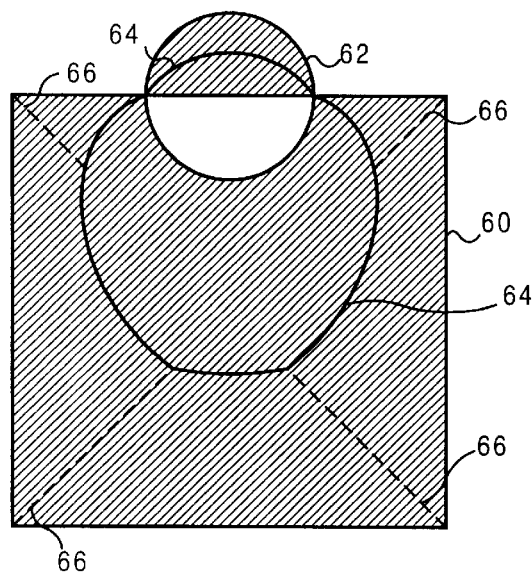
Figure 4B:
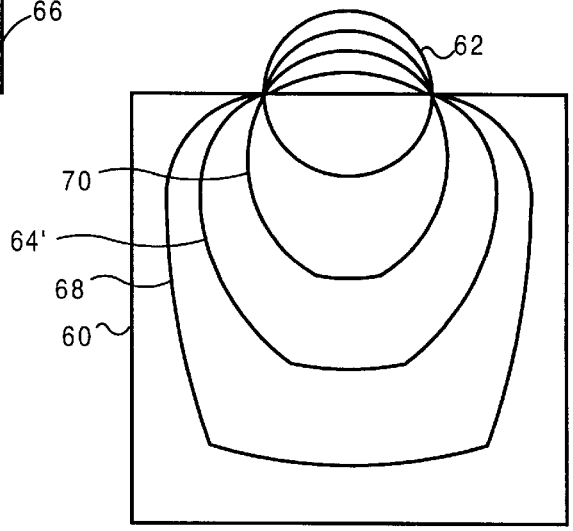
Figure 4C:
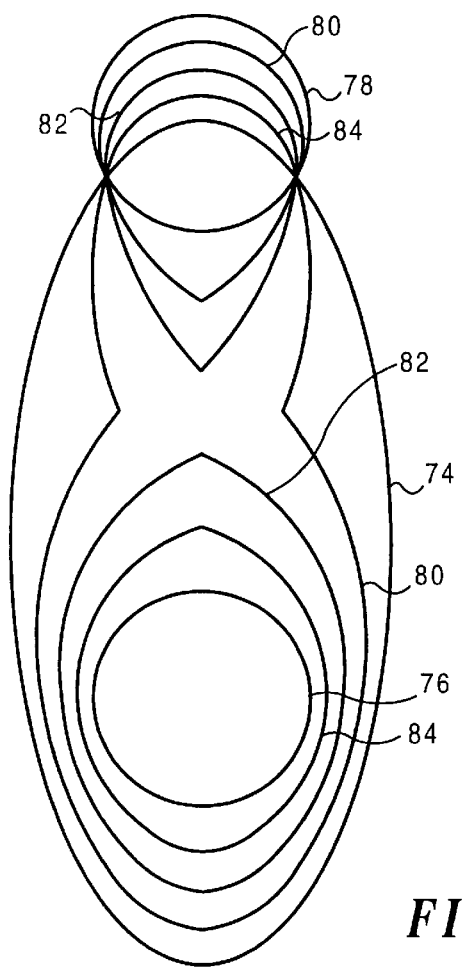
Figure 5:
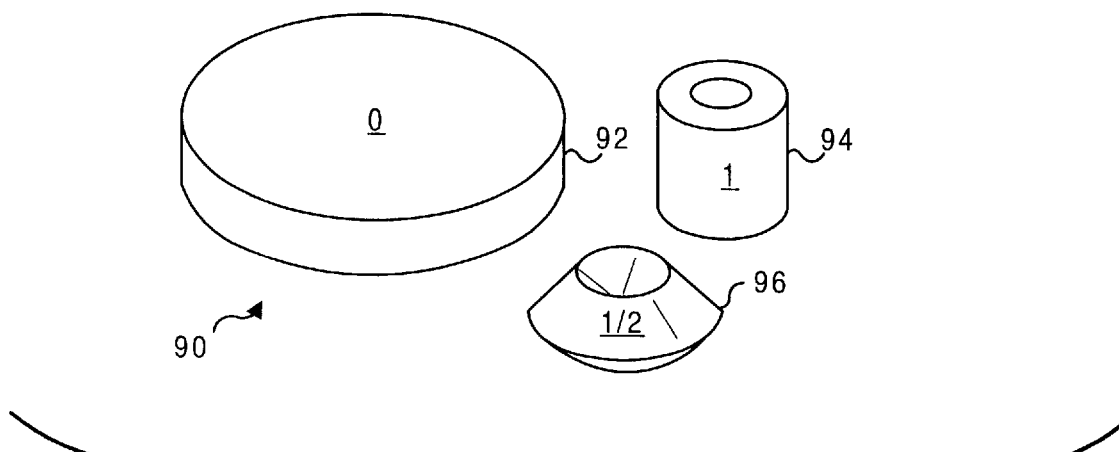
Figure 6:
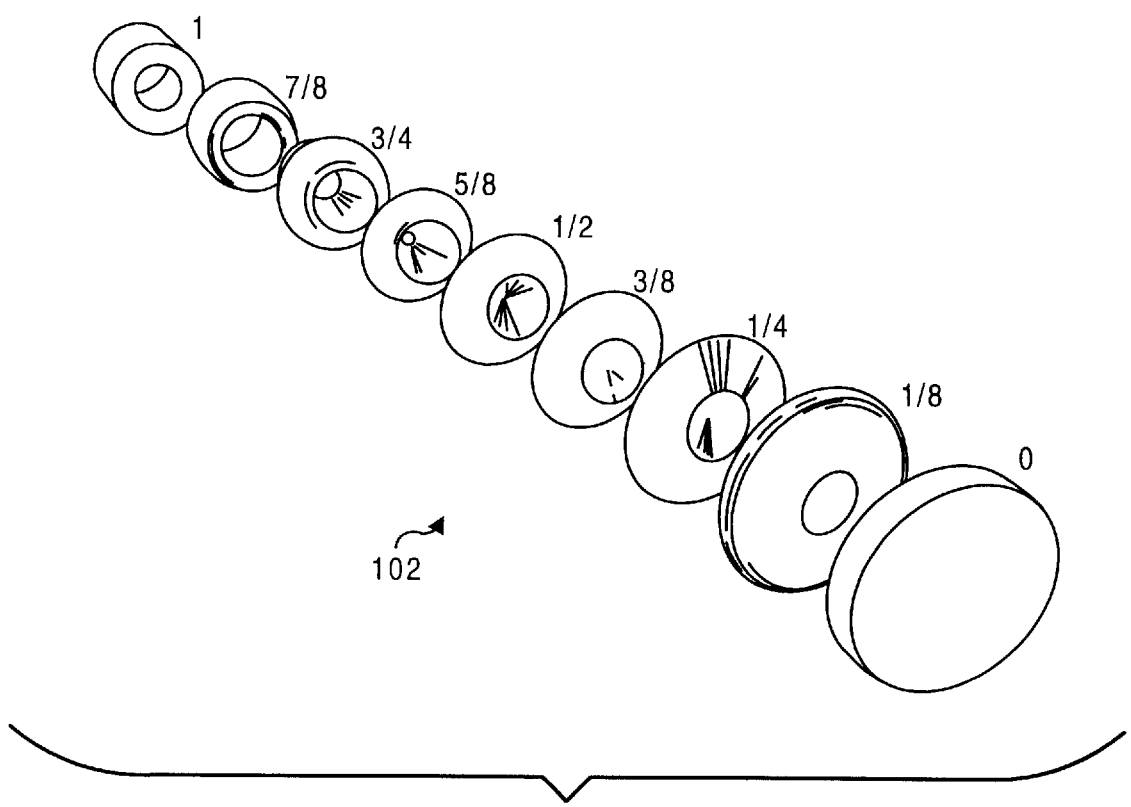
Figure 7A:
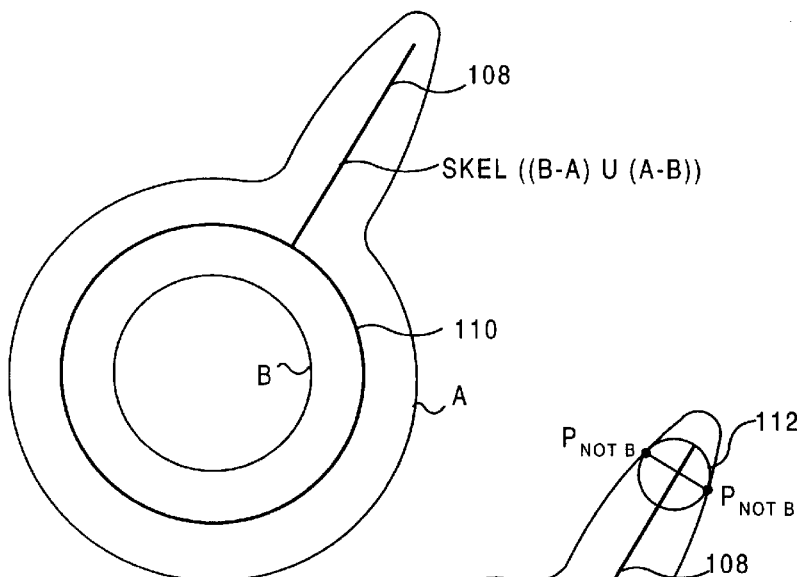
Figure 7B:
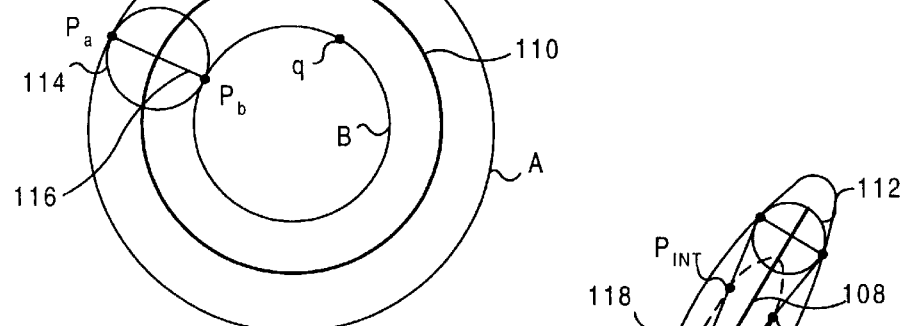
Figure 7C:
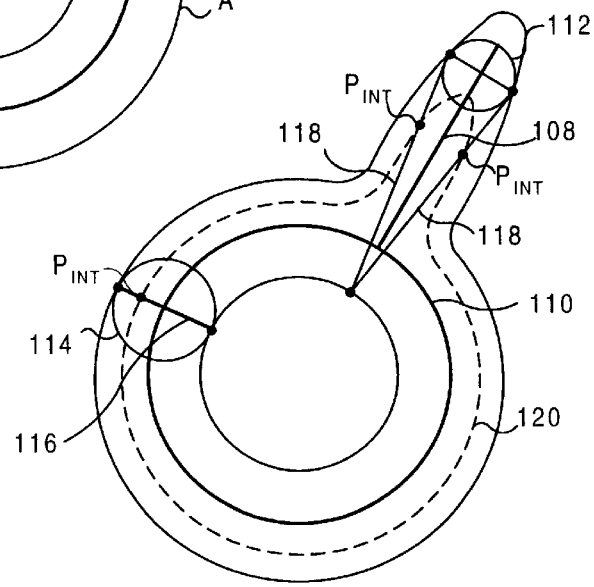
Figure 8:
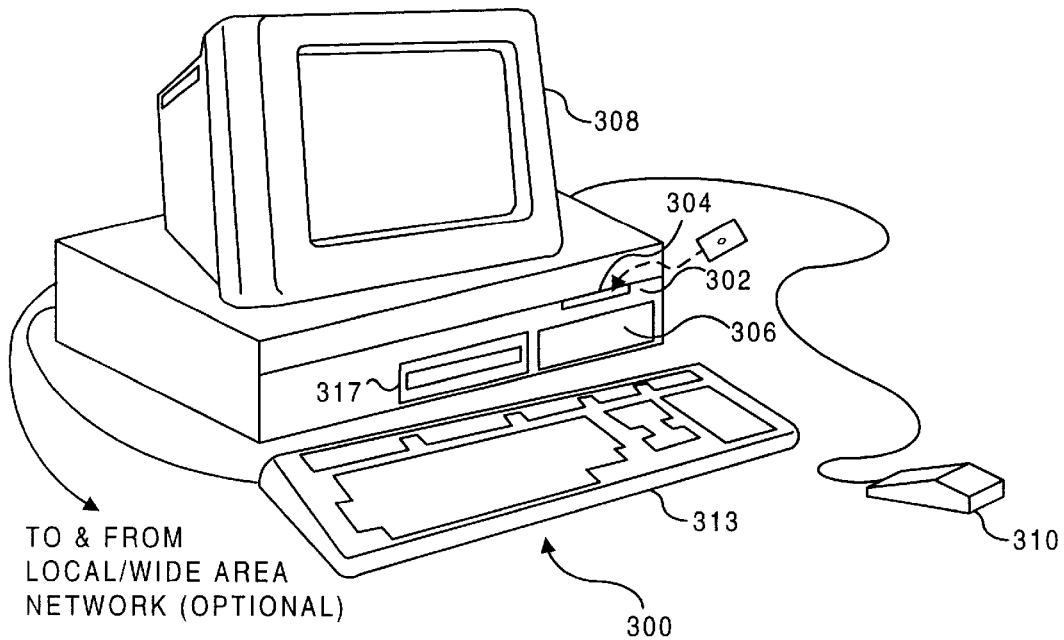

FIGS. 3A, 3B, and 3C illustrate steps in the 2D morphing from a square to a circle;

FIGS. 4A, 4B, and 4C respectively illustrate an intermediate object generated for partially overlapping initial and final objects, a morph with three intermediate objects; and a morph between topologically different objects;

FIG. 5 illustrates an application of the present invention to morphing between a 3D disk and an annular disk, showing an intermediate object;

FIG. 6 illustrates additional intermediate objects for the example shown in FIG. 5;

FIGS. 7A, 7B, and 7C illustrate the steps of an alternative geometric approach employing inscribed spheres in determining intermediate objects between two other objects, for use in morphing; and FIG. 8 is a schematic illustration of a personal computer or workstation suitable for use in implementing the present invention.

DESCRIPTION OF THE PREFERRED EMBODIMENT

Figure 1:
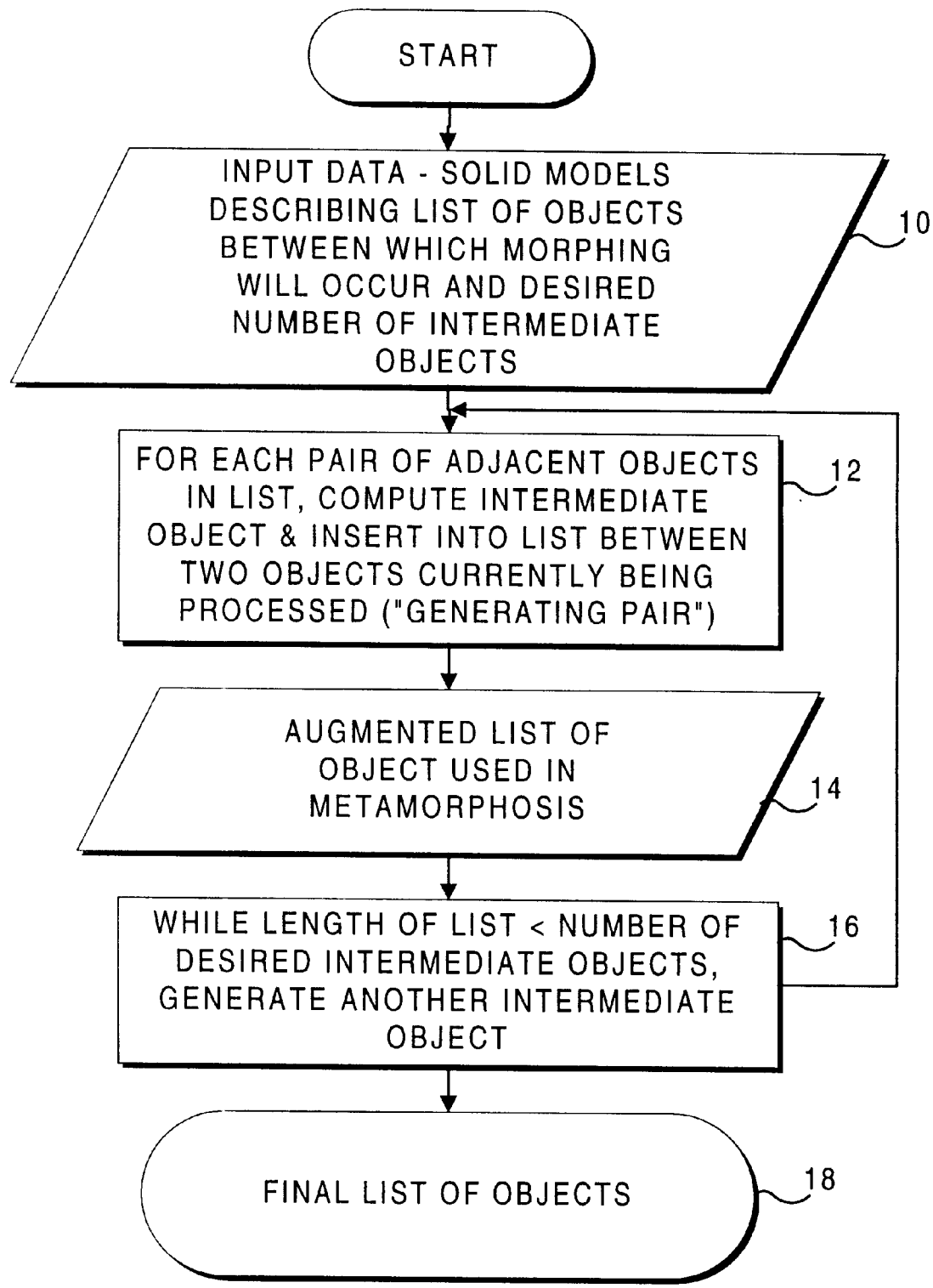
FIG. 1 is a flow chart or block diagram illustrating the procedure for constructing a sequence of intermediate objects corresponding to the geometric metamorphosis between a plurality of specified objects.

With reference to FIG. 1, the logical steps employed for constructing a sequence of intermediate objects corresponding to the geometric metamorphosis between a specified list of objects. In a block 10, input data defining solid models between which the morphing operation will be implemented are provided, along with a list of the objects. It should be noted that the present invention can be applied for morphing between one or more 3D objects (as a starting point) and one 3D object (as the last object), or between one 3D object and one or more 3D objects. If two or more objects comprise the start of the morphing process, a union of the two or more objects is initially carried out to determine an initial object with which to start the process described below. Similarly, a union of two more objects comprising the end of the morphing process is first determined before determining intermediate objects in the next step. The objects resulting from the union are used in the list of objects used in the following steps.

For each pair of objects that are adjacent in the list, which are referred to herein as the "generating pair" for an intermediate object that will be inserted between the pair of objects in the list, an intermediate object is determined in a block 12. A reference to the intermediate object is then inserted into the list between the references to the generating pair, thereby augmenting the list of objects used for the metamorphosis, as provided in a block 14. Next, a block 16 provides that while the length of the list is less than the number of desired objects input by the user, another intermediate object is determined. This step thus returns to block 12, to repeat the step of generating another intermediate object between a generating pair of objects from the list that has been augmented with the intermediate objects just determined. Accordingly, a first pair of objects in the list would include the initial object and the first intermediate object that was created, and a second pair would include the first intermediate object and the last object in the morphing procedure. The iteration of these steps tends to work through the augmented list so that the intermediate objects are created as uniformly as possible between the first and last object of the morphing process. After the number of desired objects has been obtained, the process yields a final list of objects, as indicated in a block 18. Of course, the list refers to the intermediate objects and the process provides the data to define the intermediate objects for use in the morphing process. By successively viewing each of the intermediate objects in the list after the first object, the user can observe the first object morph into the last object in the list. However, it must be emphasized that the concept of morphing is not limited to viewing rendered images of the objects in the list.

Figure 2:
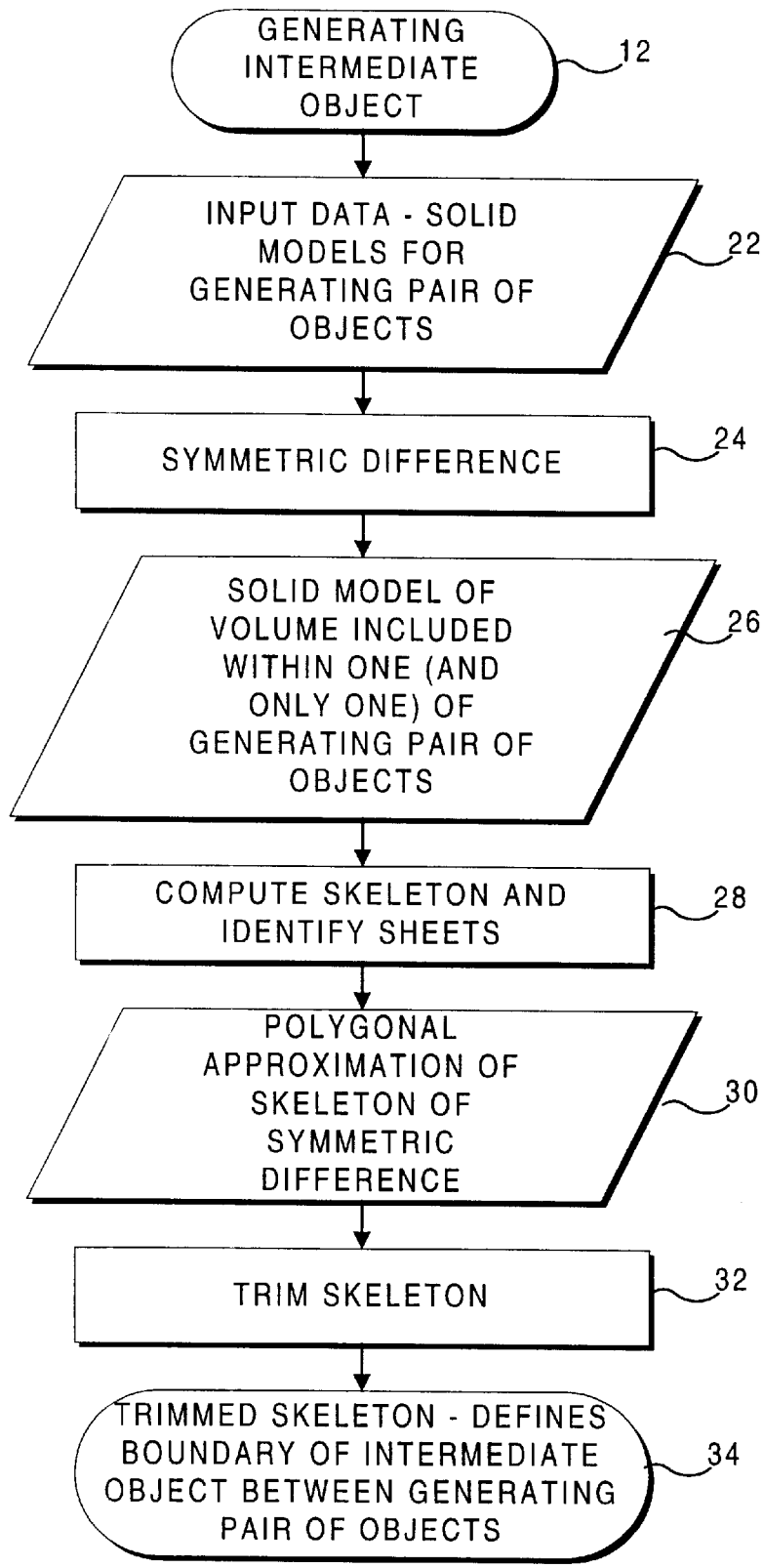
FIG. 2 is a flow chart or block diagram illustrating details of a procedure for constructing an object intermediate to two specified objects based on a skeleton of their symmetric difference.

FIG. 2 illustrates the procedure for constructing an object intermediate to two specified objects (block 12 of FIG. 1) based on the skeleton of their symmetric difference. The skeleton of an object consists of the closure of the set of points minimally equidistant from two points on the object's boundary or surface. A maximal sphere is a sphere that is centered at a point on the skeleton and which has a radius equal to the minimal distance to the object's boundary. The symmetric difference of two objects is the closure of the set of points that lies in the interior of one, but not both, of the two specified objects. For simplicity, the description of the procedure disclosed below ignores objects with internal voids. The handling of internal voids is subsequently covered in the disclosure below.

To create the intermediate object between a generating pair, a block 22 provides for input of the data that defines the two objects in the generating pair. A block 24 then provides for determining the symmetric difference between the generating pair. Examples of this step are illustrated in other Figures and discussed below.

For a solid model of the volume included within only one of the objects, but not the other object of the pair, as indicated in a block 26, a block 28 provides for computing the skeleton and identifying the "sheets" of the skeleton. Skeletal sheets are obtained by cutting all connections to the seams, which for a polygonal approximation of the skeleton, comprise edges belonging to more than two polygons. The result is a polygonal approximation of the skeleton of the difference between the pair of objects, as indicated in a block 30. Next, in a block 32, skeletal sheets are retained if they are part of a closed boundary of a volume and if their associated maximal spheres contact both objects of the generating pair. The other skeletal sheets are deleted because they do not contribute to the determination of the intermediate object. These steps, as noted in a block 34, yield a trimmed skeleton that defines the boundary of the intermediate object between the pair of objects that were input in block 22.

FIGS. 3A through 3C and 4A through 4C show an application of the invention to produce a discrete morph in two dimensions. These examples are readily extended into three dimensions consistent with the present invention, but are presented in two dimensions to more clearly demonstrate the technique employed to find intermediate objects between a pair of input objects. FIGS. 3A through 3B show two intermediate objects used in providing a discrete morph from a square 40 to a circle 42. FIG. 3A shows the initial square, which can be represented by $S(0)$, the final circle, which can be represented by $S(1)$, and a skeleton 44 of their symmetric difference. Note that since the circle is contained within the square, the symmetric difference (shown hatched) is, in this case, equivalent to square 40 with circle 42 removed. The skeleton of the square with the circle removed in FIG. 3A consists of the closed loop and four line segments 46, each respectively connecting to a different corner of the square. The full skeleton can be used to provide the intermediate object description, but the intermediate object is then an object consisting of the 2D area within the loop and the four 1D line segments. In the preferred embodiment, the skeleton of the symmetric difference is subjected to the sheet trimming process noted above in FIG. 2, block 32. In the 2D context, loops in the skeleton are identified and retained, since they bound a 2D area, and line segments 46 that do not form loops (shown dashed -- here the line segments) are removed to produce a "trimmed skeleton 44," as indicated by the solid curves. This embodiment creates intermediate objects corresponding to objects that share the dimensionality of the input objects.

In FIG. 3B, a trimmed skeleton 44', which can be referred to as $S(\frac{1}{2})$ to indicate that it serves as the intermediate object between $S(0)$ and $S(1)$, is shown. The intermediate object, $S(\frac{1}{2})$, generated at the first level of object interpolation is added to the input list between references to the pair of objects from which it was formed, so that the input list becomes $\{S(0), S(\frac{1}{2}), S(1)\}$. Consecutive pairs of objects in the input list are then taken as input for the next level of object interpolation in the morphing process. As illustrated in FIG. 3B, $S(0)$ and $S(\frac{1}{2})$ are then used as the next generating pair. Their symmetric difference, i.e., the symmetric difference between intermediate object 44' and square 40 is computed, and the skeleton of the symmetric difference is computed and trimmed by removing line segments 50 at each of the four corners to obtain the boundary corresponding to the object $S(\frac{1}{4})$, or intermediate object 48. Three intermediate objects 48', 44', and 52 corresponding to $S(\frac{1}{4})$, $S(\frac{1}{2})$, and $S(\frac{3}{4})$ are depicted in FIG. 3C, as well as circle 42 and square 40 corresponding to $S(1)$ and $S(0)$.

FIGS. 4A and 4B illustrate a discrete morph from an initial square 60, to a final circle 62 that lies partly outside the square. FIG. 4A shows the initial square, the final circle, and a skeleton 64 of their symmetric difference. The symmetric difference between the initial square and final circle is hatched, the loop to be retained as the boundary of the intermediate object is drawn as a solid line, and non-loop segments 66 (to be trimmed away) are dashed. Intermediate objects 68, 64', and 70, corresponding to $S(\frac{1}{4})$, $S(\frac{1}{2})$, and $S(\frac{3}{4})$, and initial square 60 and final circle 62, corresponding to $S(0)$ and $S(1)$ are shown in FIG. 4B, demonstrating that the effectiveness of the present invention does not depend on a particular inclusion relation between the starting and final input objects in the list.

FIG. 4C illustrates intermediate objects used for a discrete morph between an initial ellipse 74 (with a single connected component) and a final object consisting of a pair of circles 76 and 78 (with two connected components). The process starts by determining the union of circles 76 and 78. The successful generation of intermediate objects 80, 82, and 84 shown in FIG. 4C indicates that the effectiveness of the invention does not depend on topological equivalence of the input objects.

FIGS. 5 and 6 show an example of applying the present invention to produce a discrete morph in three dimensions. In the 3D context, the skeleton of the symmetric difference of the generating pair of 3D objects is trimmed by retaining collections of surfaces that enclose volume and whose maximal spheres contact the surfaces of both objects of the generating pair. FIG. 5 shows an initial object $S(0)$ or disk 90, a final object $S(1)$ or annular bushing 94, and an intermediate object 96—or $S(\frac{1}{2})$, whose boundary is the trimmed skeleton of the symmetric difference between disk 90 and annular bushing 94. To create the intermediate objects required for a discrete morph between the generating pair, a procedure is followed corresponding directly to that described for the 2D examples discussed above. The intermediate object 96 is added to the initial objects on the list, yielding the augmented list $\{S(0), S(\frac{1}{2}), S(1)\}$. Generating pairs are then taken as input to the object interpolation procedure to produce the next level of intermediate objects, i.e., $S(0)$ and $S(\frac{1}{2})$ produce $S(\frac{1}{4})$, and $S(\frac{1}{2})$ and $S(1)$ produce $S(\frac{3}{4})$, which are added to the input list in order. FIG. 6 illustrates intermediate objects 102 obtained after the third level of object interpolation, which corresponds to a discrete morph with seven intermediate objects. As the morph begins, the outer edge of the disk becomes rounded and a conical indentation appears on the top face. (A similar indentation forms on the bottom face, but is not visible in the Figure.) The indentations meet to form a cusp at $S(\frac{1}{2})$ and a through hole exists for $S(\frac{5}{8}) \ldots S(1)$. The rounded outer edge draws in and "flattens" to form the outer cylindrical surface of the annular ring. The ridge around the conical indentation draws upwards, then splits in two at $S(\frac{1}{2})$. The two ridges then move towards the two circular edges on the top of the annular ring, and the curved surface connecting the ridges flattens to form the upper annular surface of the ring. This example again demonstrates that containment and topological equivalence of $S(0)$ and $S(1)$ are not required in the present invention.

Completely disjoint objects can be morphed by composing the skeleton-based technique (deforms the object) with a rigid-body transformation and scaling, which produces overlap of the transformed generating pair, e.g., by aligning the centers of mass and the principal axes of the objects.

An alternative approach to the generation of intermediate objects and object metamorphosis determines, in a single step, a continuum of objects that are intermediate to a generating pair comprising object A and object B. (Note that the technique as used in the present invention applies to 3D objects as well as 2D objects.) This approach is illustrated with regard to 2D objects in FIGS. 7A through 7C. Rather than using the trimmed skeleton of a symmetric difference of objects A and B directly as an intermediate object, the continuous approach uses the skeleton of the symmetric difference to determine a correspondence between points on the boundary of object A and points on the boundary of object B. In the current embodiment, the correspondence is established as follows. A skeleton 110 of the symmetric difference of object A and object B is computed, but a radially extending segment 108 (a 2D analog of a sheet) is not trimmed. For maximal spheres 114 (only one such sphere is shown) that contact the boundary of object A at $P_a$ and of object B at $P_b$, correspondence is established between the contact points $P_a$ and $p_b$, which define a line segment 116.

For maximal spheres 112 (only one shown) contacting the boundary of only one of either object A or object B (it can be assumed that there is contact of a maximal sphere 112 only with object A, at points $P_{notb}$, without loss of generality), the contact point or points are associated with a point on object B as follows. From the point on the maximal sphere associated with the contact point(s), proceed along the skeleton to find the nearest point on a seam (where skeleton sheets meet) whose associated maximal sphere contacts object B at a point q. All of the contact points from the maximal sphere that contact only the boundary of object A are associated with point q.

An interpolation along line segment(s) 118 joining corresponding points produces a point Pint on the boundary of an intermediate object. For example, linear interpolation defines the intermediate boundary point as $P_{int}=tp_a+(1-t)P_b$ or $P_{int}=TP_{notb}+(1-t)q$ for any value of the interpolation parameter t on the continuous interval [0,1]. Thus, for any values of t in this interval, the collection of intermediate points associated with the set of points that forms the boundary of object A or object B comprises the boundary of the corresponding intermediate object, and a continuum of intermediate objects is directly determined. An intermediate object 120 is shown to illustrate this concept. For purposes of this disclosure and the claims that follow, the term "line segment" is intended to encompass curved lines as well as straight lines. The continuous approach is more efficient, but the results obtained can be less intuitive than those obtained by the discrete method unless objects A and B are sufficiently close.

The preferred embodiment described above also applies to objects with internal cavities or voids.

An alternative embodiment handles objects with internal voids by treating the outer boundary of the objects and the boundary of their void(s) separately. The outer boundaries of the generating pair are morphed using the technique of the preferred embodiment described above. The boundaries of pairs of overlapping voids, one in each of the generating pairs, are also morplied according to the above described preferred embodiment. Finally, remaining void boundaries are morphed to components of their skeletons. The alternative embodiment can produce more desirable results for generating pairs with little overlap.

System for Implementing the Creation of Intermediate Objects for Morphing

With reference to FIG. 8, a generally conventional personal computer 300 is illustrated, which is suitable for use in connection with practicing the present invention. Alternatively, a corresponding workstation on a local area network may be used for executing machine instructions comprising a computer program that causes the present invention to be executed. Personal computer 300 includes a processor chassis 302 in which are mounted a floppy disk drive 304, a hard drive 306, a motherboard populated with appropriate integrated circuits (not shown), and a power supply (also not shown), as are generally well known to those of ordinary skill in the art. A monitor 308 is included for displaying graphics and text generated by software programs that are run by the personal computer, and for graphically representing models of objects produced by the present invention. A mouse 310 (or other pointing device) is connected to a serial port (or to a bus port) on the rear of processor chassis 302, and signals from mouse 310 are conveyed to the motherboard to control a cursor on the display and to select text, menu options, and graphic components displayed on monitor 308 by software programs executing on the personal computer. In addition, a keyboard 313 is coupled to the motherboard for user entry of text and commands that affect the running of software programs executing on the personal computer.

Personal computer 300 also optionally includes a compact disk-read only memory (CD-ROM) drive 317 into which a CD-ROM disk may be inserted so that executable files and data on the disk can be read for transfer into the memory and/or into storage on hard drive 306 of personal computer 300. Alternatively, other types of drives used for reading mass storage memory media, such as DVDs can be included. The machine instructions comprising the software program that causes the CPU to implement the functions of the present invention that have been discussed above will likely be distributed on floppy disks, CD-ROMs, or other memory media and stored in the hard drive until loaded into random access memory (RAM) for execution by the CPU.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for morphing between a plurality of three-dimensional (3D) objects, each of which is represented by boundary data, comprising the steps of:
   (a) creating a list of the 3D objects and a desired number of intermediate 3D objects to create when morphing between the 3D objects;
   (b) for a pair of 3D objects that are adjacent in the list, determining an intermediate 3D object by:
      (i) determining a volume corresponding to a closure of a set of points included in one of the pair of 3D objects but not within the other of the pair of 3D objects, said volume comprising the symmetric difference between the pair of 3D objects;
      (ii) determining a skeleton of the symmetric difference that defines the intermediate 3D object; and
      (iii) inserting a reference to the intermediate 3D object between the pair of 3D objects in the list;
   (c) repeating steps (b)(i) through (b)(iii) for other pairs of the 3D objects, including the intermediate 3D objects, until the desired number of intermediate 3D objects is obtained; and
   (d) producing a final list that includes the plurality of 3D objects and the intermediate 3D objects in an order in which they occur when morphing between the plurality of 3D objects.

2. The method of claim 1, further comprising the step of enabling a user to visually perceive the morphing by viewing successive 3D objects in the final list.

3. The method of claim 1, wherein the step of determining the intermediate 3D object further comprises the step of trimming away any portions of the skeleton that are not part of a boundary for a 3D region that the skeleton encloses.

4. The method of claim 1, wherein the desired number of 3D objects is specified in terms of a total time to morph between the plurality of 3D objects and a time interval for each intermediate 3D object.

5. The method of claim 1, wherein the step of finding the skeleton of the symmetric difference comprises the step of identifying each point that is minimally equidistant from two points on a boundary of the symmetric difference, said skeleton comprising a closure through points thus identified.

6. A method for determining intermediate 3D objects between a pair of 3D objects used in morphing, each 3D object of the pair being represented by boundary data, comprising the steps of:
(a) determining a volume corresponding to a closure of a set of points included in one 3D object of the pair of 3D objects that is not included within the other 3D object of the pair of 3D objects, said volume corresponding to a symmetric difference between the pair of 3D objects;
(b) creating a correspondence between selected pairs of points on a boundary of one of the 3D objects with selected points on a boundary of the other 3D object of the pair as a function of the the symmetric difference;
(c) constructing line segments connecting the selected pairs of points on the boundaries of the pair of 3D objects; and
(d) interpolating along the line segments to define boundaries of the intermediate 3D objects.

7. The method of claim 6, wherein the step of creating a correspondence between selected pairs of points comprises the steps of:
(a) determining a skeleton for the symmetric difference; and
(b) determining a plurality of maximal spheres centered on the skeleton, each maximal sphere being tangent to one point on the boundary of one of the 3D objects and tangent to one point on the boundary of the other 3D object, and disposed within the volume, said points to which each maximal sphere is tangent comprising one pair of the selected points that correspond to each other, said pair of selected points that correspond to each other defining ends of line segments through different ones of the plurality of maximal spheres.

8. A method for using a computer to determine an intermediate 3D object between two given 3D objects that are defined by input data, for use in morphing, comprising the steps of:
(a) determining a volume corresponding to a closure of a set of points included in one 3D object of said two give 3D objects that is not included within the other 3D object, said volume corresponding to a symmetric difference between the pair of 3D objects; and
(b) determining a skeleton for the symmetric difference, said skeleton defining the intermediate 3D object.

9. The method of claim 8, wherein at least one of the two given 3D objects comprises a union of a plurality of other 3D objects.

10. The method of claim 8, wherein the step of determining the skeleton comprises the step of trimming away any portion of the skeleton that is not part of a boundary for a 3D region that the skeleton encloses.

11. The method of claim 8, wherein at least one of said two given 3D objects comprises a previously determined intermediate 3D object, the other of the two given 3D objects comprising one of an initial 3D object and a final 3D object for a morphing procedure.

12. The method of claim 8, wherein both of said two given 3D objects comprise previously determined intermediate 3D objects.

13. The method of claim 8, wherein the step of determining the skeleton of the symmetric difference comprises the step of identifying each point that is minimally equidistant from two points on a boundary of the symmetric difference.

14. Apparatus for use in morphing between a plurality of 3D objects, each of which is represented by boundary data, comprising:
(a) a memory in which a plurality of machine instructions comprising a computer program are stored; and
(b) a processor, coupled to the memory and responsive to the machine instructions, the machine instructions of said computer program when executed by the processor, causing the processor to:
(i) store a list of the 3D objects and a desired number of intermediate 3D objects to create when morphing between the 3D objects in the memory;
(ii) for a pair of 3D objects that are adjacent in the list, determine an intermediate 3D object by:
(1) determining a volume corresponding to a closure of a set of points included in one of the pair of 3D objects, but not included within the other of the pair of 3D objects, said volume comprising the symmetric difference between the pair of 3D objects,
(2) determining a skeleton of the symmetric difference that defines the intermediate 3D object, data for the skeleton being stored in the memory by the processor; and
(3) inserting a reference to the intermediate 3D object between the pair of 3D objects in the list stored in the memory; and
(iii) repeat steps (ii)(1) through (ii)(3) for other pairs of the 3D objects, including the intermediate 3D objects, until the desired number of intermediate 3D objects is obtained and stored in the memory; and
(iv) produce a final list that includes the plurality of 3D objects and the intermediate 3D objects in an order in which they occur when morphing between the plurality of 3D objects, said final list also being stored in the memory.

15. The apparatus of claim 14, further comprising a display on which a user visually perceives the morphing by rapidly displaying successive 3D objects from the final list.

16. The apparatus of claim 14, wherein the computer program further causes the processor to determine the intermediate 3D object by trimming away any portions of the skeleton that are not part of a boundary for a 3D region that the skeleton encloses.

17. The apparatus of claim 14, wherein the computer program causes the computer to find the skeleton of the symmetric difference by identifying each point that is minimally equidistant from two points on a boundary of the symmetric difference.

18. Apparatus for determining intermediate 3D objects between a pair of 3D objects for use in morphing, each 3D object of the pair being represented by boundary data, comprising:

(a) a memory in which is stored a plurality of machine instructions that comprise a computer program; and (b) a processor coupled to the memory, said processor carrying out a plurality of functions when executing the machine instructions comprising the computer program, including:

(i) determining a volume corresponding to a closure of a set of points included in one 3D object of the pair of 3D objects, but not included within the other 3D object of the pair of 3D objects, said volume corresponding to a symmetric difference between the pair of 3D objects;

(ii) creating a correspondence between selected pairs of points on a boundary of one of the 3D objects with selected points on a boundary of the other 3D object of the pair as a function of the symmetrical difference;

(iii) constructing line segments connecting the selected pairs of points on the boundaries of the pair of 3D objects; and (iv) interpolating along the line segments to define boundaries of the intermediate 3D objects.

19. The apparatus of claim 18, wherein the machine instructions create the correspondence between the selected pairs of points by:

(a) determining a skeleton for the symmetric difference; and (b) determining a plurality of maximal spheres centered on the skeleton, each maximal sphere being tangent to one point on the boundary of one of the 3D objects and tangent to one point on the boundary of the other 3D object, and disposed within the volume, said points to which each maximal sphere is tangent comprising one pair of the selected points that correspond to each other, said pair of selected points that correspond to each other defining ends of line segments through different ones of the plurality of maximal spheres.

20. Apparatus for determining an intermediate 3D object between two given 3D objects that are defined by input data, for use in morphing, comprising:

(a) a memory in which a plurality of machine instructions comprising a computer program are stored; and (b) a processor, coupled to the memory, said processor executing the machine instructions to implement a plurality of functions, including:

(i) determining a volume corresponding to a closure of a set of points included in one 3D object of said two give 3D objects, but not included within the other 3D object, said volume corresponding to a symmetric difference between the pair of 3D objects; and (ii) determining a skeleton for the symmetric difference, said skeleton defining the intermediate 3D object and being stored in the memory by the processor.

21. An article of manufacture adapted to be used with a computer for morphing between a plurality of 3D objects, each of which is represented by boundary data, comprising:

(a) creating a list of the 3D objects and entering a desired number of intermediate 3D objects to create when morphing between the 3D objects;

(b) for a pair of 3D objects that are adjacent in the list, determining an intermediate 3D object by:

(i) determining a volume corresponding to a closure of a set of points included in one of the pair of 3D objects, but not included within the other of the pair of 3D objects, said volume comprising the symmetric difference between the pair of 3D objects;

(ii) determining a skeleton of the symmetric difference that defines the intermediate 3D object; and (iii) inserting a reference to the intermediate 3D object between the pair of 3D objects in the list; and (c) repeating steps (b)(i) through (b)(iii) for other pairs of the 3D objects, including the intermediate 3D objects, until the desired number of intermediate 3D objects is obtained; and (d) producing a final list that includes the plurality of 3D objects and the intermediate 3D objects in an order in which they occur when morphing between the plurality of 3D objects.

22. An article of manufacture adapted to be used with a computer, for determining intermediate 3D objects between a pair of 3D objects for use in morphing, each 3D object of the pair being represented by boundary data, comprising:

(a) a memory media; and (b) a plurality of machine instructions, which when executed by the computer, causes the computer to implement functions that include:

(i) determining a volume corresponding to a closure of a set of points included in one 3D object of the pair of 3D objects, but not included within the other 3D object of the pair of 3D objects, said volume corresponding to a symmetric difference between the pair of 3D objects;

(ii) creating a correspondence between selected pairs of points on a boundary of one of the 3D objects with selected points on a boundary of the other 3D object of the pair as a function of the symmetric difference;

(iii) constructing line segments connecting the selected pairs of points on the boundaries of the pair of 3D objects; and (iv) interpolating along the line segments to define boundaries of the intermediate 3D objects.

23. The article of manufacture of claim 22, wherein the machine instructions, when executed by a computer cause the computer to create the correspondence between the selected pairs of points by:

(a) determining a skeleton for the symmetric difference; and (b) determining a plurality of maximal spheres centered on the skeleton, each maximal sphere being tangent to one point on the boundary of one of the 3D objects and tangent to one point on the boundary of the other 3D object, and disposed within the volume, said points to which each maximal sphere is tangent comprising one pair of the selected points that correspond to each other, said pair of selected points that correspond to each other defining ends of line segments through different ones of the plurality of maximal spheres.

* * * * *

UNITED STATES PATENT AND TRADEMARK OFFICE
CERTIFICATE OF CORRECTION

PATENT NO. : 6,094,199
DATED : July 25, 2000
INVENTOR(S) : Turkiyyah et al.

It is certified that error appears in the above-identified patent and that said Letters Patent is hereby corrected as shown below:

Title page,
Item [56], References Cited, OTHER PUBLICATIONS, after the third line, please add:
-- Barequet, G., et al., *Piecewise-Linear Interpolation Between Polygonal Slices*, Proceedings of the Tenth Annual Symposium on Computational Geometry, pp. 93-102. ACM Press, June 1994.
Blechschmidt, J.L., et al., *The Use of Algebraic Functions as a Solid Modeling Alternative: An Investigation*, Advances in Design Automation: Computer-Aided and Computational Design, Vol. DE-23(1), 1990, pp. 33-41.
Blinn, J.F., *A Generalization of Algebraic Surface Drawing*, ACM Transactions on Graphics, Vol. 1, No. 3, July 1982, pp. 235-256.
Bloomenthal, J., *An Implicit Surface Polygonizer*. Graphic Gems IV, P.S. Heckbert, editor, AP Professional, Cambridge, Massachusetts, 1994, pp. 324-349.
Blum, H., *A Transformation for Extracting New Descriptors of Shape*. Models for the Perception of Speech and Visual Form, W. Wathen-Dunn, editor, MIT Press, 1967, pp. 362-381.
Boissonnat, J.D., *Geometric Structures for Three-Dimensional Shape Representation*, ACM Transactions on Graphics, 3(4), 1984, pp. 266-286.
Boissonnat, J.D., *Shape Reconstruction from Planar Cross Sections*, Computer Vision, Graphics, and Image Processing, Vol. 44, October 1988, pp.1-29.
Boult, T.E., et al., *Recovery of Superquadrics from Depth Information*, Proceedings of Workshop on Spatial Reasoning and Multi-Sensor Fusion, 1987, pp. 128-137.
Chiang, C.S., et al., *How to Compute Offsets Without Self Intersection*, Curves and Surface in Computer Vision and Graphics II, SPIE, Vol. 1610, 1991.
Chou, J.J., *Voronoi Diagrams for Planar Shapes*. IEEE Computer Graphics and Applications, 15(2), March 1995, pp. 52-59.
Christiansen, H., et al., *Conversion of Complex Contour Line Definitions Into Polygonal Element Mosaics*, Computer Graphics, 12(3), 1978, pp. 187-192.
Danielsson, P.E., *Euclidean Distance Mapping*, Computer Graphics and Image Processing, 14, 1980, pp. 227-248.
DeRose, T., et al., *Geometric Continuity, Shape Parameters, and Geometric Constructions for Catmull-Rom Splines*, ACM Transactions on Graphics, 7(1), 1988, pp. 1-41.
Dobkin, D.P., et al., *Primitives for the Manipulation of Three-Dimensional Subdivisions*, Algorithmica, Vol. 4, 1989, pp. 3-32.
Dong, Y., et al., *Building Solid Models From Serial Contour Images*, Proceedings of the SPIE-Image and Video Processing III, Vol. 2421, San Jose, California, USA, 9-10 Feb. 1995, pp.152-160.
Dutta, D., et al., *On the Skeleton of Simple CSG Objects*, ASME Journal of Mechanical Design, 115(1), 1992, pp. 87-94.
Edelsbrunner, H., et al., *Three-Dimensional Alpha Shapes*, ACM Transactions on Graphics, 13(1), 1994, pp. 43-72.

UNITED STATES PATENT AND TRADEMARK OFFICE
CERTIFICATE OF CORRECTION

PATENT NO. : 6,094,199
DATED : July 25, 2000
INVENTOR(S) : Turkiyyah et al.

It is certified that error appears in the above-identified patent and that said Letters Patent is hereby corrected as shown below:

Ensz, M.T., et al., *Implicit Function Alteration Via Radius Mapping and Direct Function Modification,* ASME Advances in Design Automation, DE-Vol. 82-1, 1995, pp. 57-64.
Ferrie, F.P., *Recovery of Volumetric Object Descriptions From Laser Rangefinder Images,* Proceedings of Computer Vision, ECCV 90, Antibes, France, 1990, pp. 387-396.
Foley, TA., et al., *Advances in Scattered Data Interpolation,* Surveys on Mathematics for Industry, 4(2),1994, pp. 71-84.
Franke, R., et al., *Scattered Data Interpolation and Applications: A Tutorial and Survey,* Geometric Modeling, Methods and Applications, Boblingen, Germany, June 1990, pp. 131-160.
Fuchs, H., et al., *Optimal Surface Reconstruction From Planar Contours,* Communications of the ACM, Vol. 20, No. 10, October 1997, pp. 693-702.
Ganapathy, S., et al., *A New General Triangulation Method for Planar Contours,* Computer Graphics, 16(3), 1982, pp. 69-75.
Ganter, M.A., et al., *On Algebraic Methods for Implicit Swept Solids with Finite Extent,* Advances in Design Automation, DE-Vol. 65-2, Vol. 2, Albuquerque, New Mexico, September 1993, pp. 389-396.
Gelston, S.M., et al., *Boundary Surface Recovery From Skeleton Curves and Surfaces,* Computer Aided Geometric Design, 12(2), 1995, pp. 27-51.
Gursoy, H.N., et al., *An Automated Coarse And Fine Surface Mesh Generation Scheme Based On Medial Axis Transform: Part I Algorithms,* Engineering With Computers, 8 (3),1992, PP.121-137.
Hoffman, C.M., *How to Construct the Skeletons of CSG Objects,* PROCEEDINGS OF THE FOURTH IMA Conference: The Mathematics of Surfaces, A. Bowyer and J. Davenport, editors, pp. 77-88. Oxford University Press, 1994.
Hoffman, C.M., *Constrained Surface Computations and Applications in Geometric Modeling,* Workshop on Computational Geometry, World Scientific Publishing Co., 1993, pp. 175-200.
Hoppe, H., et al., *Mesh Optimization,* Computer Graphics Proceedings, Siggraph '93, pp. 19-26, Annual Conference Series, 1993, pp.19-26.
Hoppe, H., et al., *Surface Reconstruction From Unorganized Points,* Computer Graphics, Siggraph '92, 1992, pp. 71-78.
Hsieh, Y.C., et al., *Reconstruction of Sculptured Surfaces Using Coordinate Measuring Machines,* Advances in Design Automation, DE-Vol. 65-2, ASME, Vol. 2, Albuquerque, New Mexico, USA, 1993, pp. 35-46.
Keppel, E., *Approximating Complex Surfaces by Triangulation of Contour Lines,* IBM Journal of Research and Development, Vol. 19, Jan. 1975, pp. 2-11.
Kumar, V., et al., *An Assessment of Data Formats for Layered Manufacturing,* Advances in Engineering Software, Report No. UM-MEAM-95-22, University of Michigan (1995).

UNITED STATES PATENT AND TRADEMARK OFFICE
CERTIFICATE OF CORRECTION

PATENT NO. : 6,094,199
DATED : July 25, 2000
INVENTOR(S) : Turkiyyah et al.

It is certified that error appears in the above-identified patent and that said Letters Patent is hereby corrected as shown below:

Lee, D.T., *Medial Axis Transformation of a Planar Shape,* IEEE Transactions of Pattern Analysis and Machine Intelligence, Vol PAMI-4, No. 4, July 1982, pp. 363-369.
Leymarie, F., et al., *Simulating the Grassfire Transform Using an Active Contour Model,* IEEE Transactions on Pattern Analysis and Machine Intelligence, Vol. 14, No. 1, January 1992, pp. 56-75.
Lim, C.T., et al., *Algebraic Computer Aided-Design with Maple V2,* Mathematical Computation with Maple V: Ideas and Applications, Proceedings of the Maple Summer Workshop and Symposium, T. Lee, editor, University of Michigan, Ann Arbor, June 28-30, 1993, Boston, Massachusetts, USA, 1993, pp 169-175.
Lim, C.T., et al., *Implicit Reconstruction of Solids from Cloud Point Sets,* Third Symposium on Solid Modeling and Applications, C. Hoffman and J. Rossignac, editors, ACM Press, Salt Lake City, Utah, 1995, pp. 393-402.
Lim, C.T., et al., *Object Reconstruction From Layered Data Using Implicit Solid Modeling,* Journal of Manufacturing Systems, Vol. 16, No. 4,1977, pp. 1-13.
Lin, W.C., et al., *A New Surface Interpolation Technique for Reconstructing 3D Objects from Serial Cross-Sections,* Computer Vision, Graphics, and Image Processing, Vol. 48, 1989, pp. 124-143.
Macworld Website, *Research Systems' Visible Human CD [PMAC],* Nov. 1995, 1 pg, http://www.macworld.com/pages/november.95/newproducts.1295.html.
Meshkat, S. N., et al., *Voronoi Diagram for Multiply-Connected Polygonal Domains II: Implementation and Application,* IBM Journal of Research and Development, Vol. 31, No. 3, 1987, pp. 373-381.
Middleditch, A.E., et al., *Blend Surfaces for Set Theoretic Volume Modelling Systems,* Computer Graphics (SIGGRAPH '85 Proceedings), B.A. Barsky, editor, Vol. 19, No. 3, July 1985, pp. 161-170.
Muraki, S., *Volumetric Shape Description of Range Data Using "Blobby Model, "* Computer Graphics (Siggraph '91 Proceedings), Vol. 25, No. 4, July 1991, pp. 227-235.
Nackman, L.R, *Curvature Relations in Three-Dimensional Symmetric Axes,* Computer Graphics and Image Processing, Vol. 20, 1982, pp. 43-57.
Nackman, L.R., et al., *Three-Dimensional Shape Description Using the Symmetric Axis Transform I: Theory,* IEEE Transactions on Pattern Analysis and Machine Intelligence, Vol. PAMI-7(2), pp. 187-202.
Patrikalakis, N.M., et al., *Feature Extraction from B-Spline Marine Propeller Representations,* Journal of Ship Research, 36(3), Sept. 1992, pp. 233-247.
Patrikalakis, N.M., et al., *Shape Interrogation by Medial Axis Transform,* Advances in Design Automation: Computer-Aided and Computational Design, ASME, Vol. 1, 1990, pp. 77-88.
Preparata, F.P., *The Medial Axis of A Simple Polygon,* Lecture Notes in Computer Science: Mathematical Foundations of Computer Science, G. Coos and J. Hartmanis, editors, Springer-Verlag, 1977, pp. 443-450.

UNITED STATES PATENT AND TRADEMARK OFFICE
CERTIFICATE OF CORRECTION

PATENT NO. : 6,094,199
DATED : July 25, 2000
INVENTOR(S) : Turkiyyah et al.

It is certified that error appears in the above-identified patent and that said Letters Patent is hereby corrected as shown below:

Reddy, J.M., et al., *Computation of 3D Skeletons Using a Generalized Delaunay Triangulation Technique,* Computer-Aided Design, Vol. 27, No. 9, September 1995, pp. 677-694.
Ricci, A., *A Constructive Geometry for Computer Graphics,* The Computer Journal, 16 (2), May 1973, pp. 157-160.
Schroeder, WJ, et al., *An O(N) Algorithm to Automatically Generate Geometric Triangulations Satisfying the Delaunay Circumsphere Criteria,* Engineering with Computers, 5(3), 1989, pp. 177-193.
Scott, G.L., et al., *Using a Mixed Wave/Diffusion Process to Elicit the Symmetry Set,* Image and Vision Computing, 7(1), 1989, pp. 63-70.
Shapiro, V., *Real Functions for Representation of Rigid Solids,* Computer Aided Geometric Design, 11(2), 1994, pp. 153-175.
Shapiro, V., *Real Functions for Representation of Rigid Solids,* Cornell University, Department of Computer Science, No. TR91-1245, 1991, pp. 1-24.
Sheehy, D.J., et al., *Computing the Medial Surface of a Solid From a Domain Delaunay Triangulation,* Proceedings of the Third Symposium on Solid Modeling and Applications, C. Hoffman and J. Rossignac, editors, ACM Press, 1995, pp. 201-212.
Sherbrooke, E.C., et al., *Computation of the Medial Axis Transform of 3-D Polyhedra,* Proceedings of the Third Symposium on Solid Modeling and Applications, C. Hoffman and J. Rossignac, editors, ACM Press, 1995, pp. 187-199.
Sloan, K.R., et al., *From Contours to Surfaces: Testbed and Initial Results.* Proceedings of CHI+GI, Toronto, Canada, April 1987, pp. 115-120.
Sourin, A., et al., *Function Representation for Sweeping by a Moving Solid*, Proceedings of the Third Symposium on Solid Modeling and Applications, C. Hoffman and J. Rossignac, editors, ACM Press, 1995, pp. 383-391.
Spivak, M., *A Comprehensive Introduction to Differential Geometry,* Publish or Perish, Vol. 3, 1975, pp. 199-203.
Storti, D. et al., *A Tutorial on Implicit Solid Modeling,* The Mathematical Journal, Vol. 2, Issue 3, Summer 1992, pp. 70-78.
Sudhalkar, A., et al., *Continuous Skeletons of Discrete Objects,* Proceedings of the Second Symposium on Solid Modeling and Applications, J. Rossignac, J. Turner, and G. Allen, editors, AC Press, 1993, pp. 85-94.
Turkiyyah, G.M., et al., *An Accelerated Triangulation Method for Computing the Skeletons of Free-Form Solid Models,* Computer-Aided Design, Vol. 29, No. 1, 1997, pp. 5-19.
Widmann, R., *An Efficient Algorithm for the Triangulation of Surfaces in $IR^3$,* Preprint, Colorado State University, Department of Mathematics, Fort Collins, Colorado, 1990.
Wyvill, G., et al., *Data Structure for Soft Objects,* The Visual Computer, 2(4), 1986, pp. 227-234.
Yuille, A., et al., *3D Symmetry-Curvature Duality Theorems,* Computer Vision, Graphics, and Image Processing, 52, 1990, pp. 124-140.

UNITED STATES PATENT AND TRADEMARK OFFICE
CERTIFICATE OF CORRECTION

PATENT NO.    : 6,094,199
DATED         : July 25, 2000
INVENTOR(S)   : Turkiyyah et al.

It is certified that error appears in the above-identified patent and that said Letters Patent is hereby corrected as shown below:

Column 1,
Line 15, before the "FIELD OF THE INVENTION" section, please insert the following:

-- GOVERNMENT RIGHTS
This invention was made with government support under contract N00014-95-1-0355 awarded by the Office of Naval Research; contract DMI-9312932 awarded by the National Science Foundation; and contract 2-831 awarded by the National Aeronautics & Space Administration. The government has certain rights in the invention. --
Line 36, "two dimensional" should read -- two-dimensional --

Column 7,
Line 15 "$P_a$" should read -- $p_a$ --
Line 16 "$P_b$" should read -- $p_b$ --
Line 17 "$P_a$" should read -- $p_a$ --
Line 22 "$P_{notb}$" should read -- $p_{notb}$ --
Line 32 "$P_{int}$" should read -- $p_{int}$ --
Line 34 "$P_{int}=tp_a+(1-t)P_b$" should read -- $p_{int}=tp_a+(1-t)p_b$ --
Line 35 "$P_{int}=TP_{notb}+(1-t)q$" should read -- $p_{int}=tp_{notb}+(1-t)q$ --
Line 58 "morplied" should read -- morphed --

Signed and Sealed this

Twelfth Day of November, 2002

*Attest:*

*Attesting Officer*

JAMES E. ROGAN
*Director of the United States Patent and Trademark Office*